(No Model.) 2 Sheets—Sheet 2.
G. T. SMITH & W. H. DICKEY.
CENTRIFUGAL REEL.
No. 327,332. Patented Sept. 29, 1885.
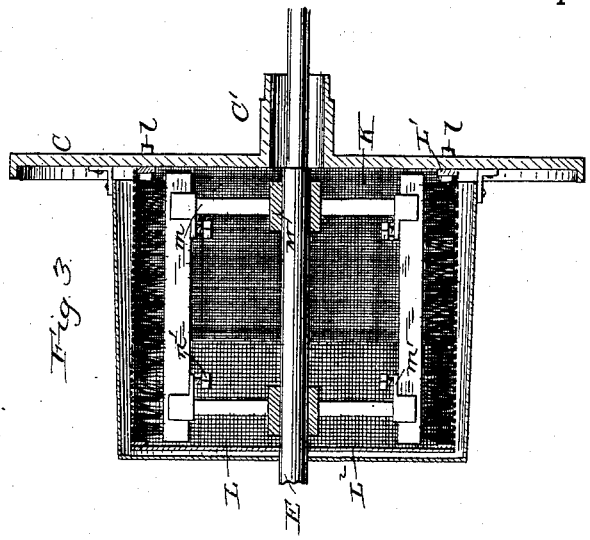
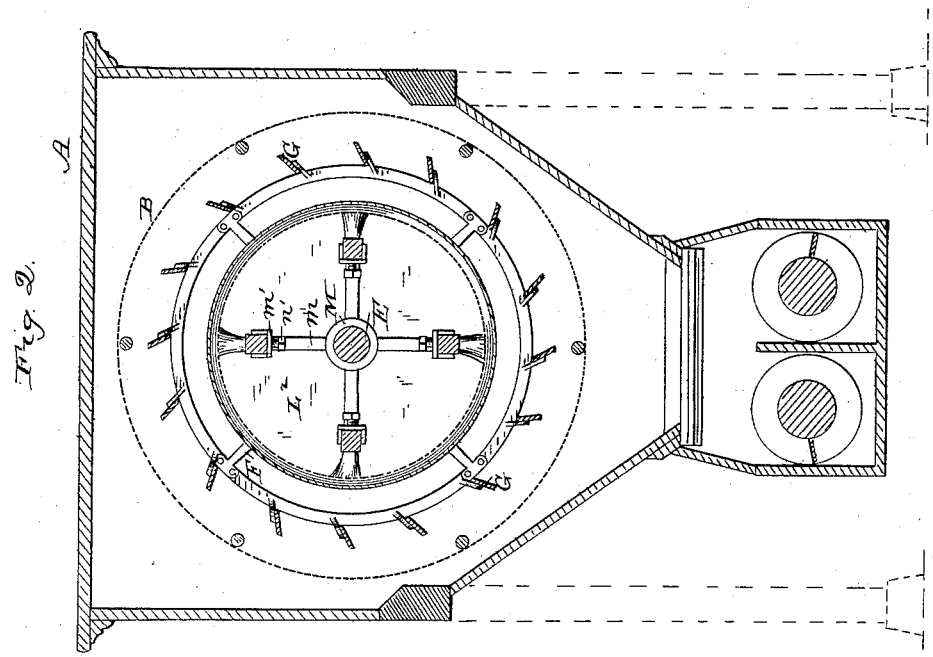
Witnesses
N. N. Low
J. S. Barker.
Inventors
George T. Smith and William H. Dickey
by Doubleday & Bliss
attys

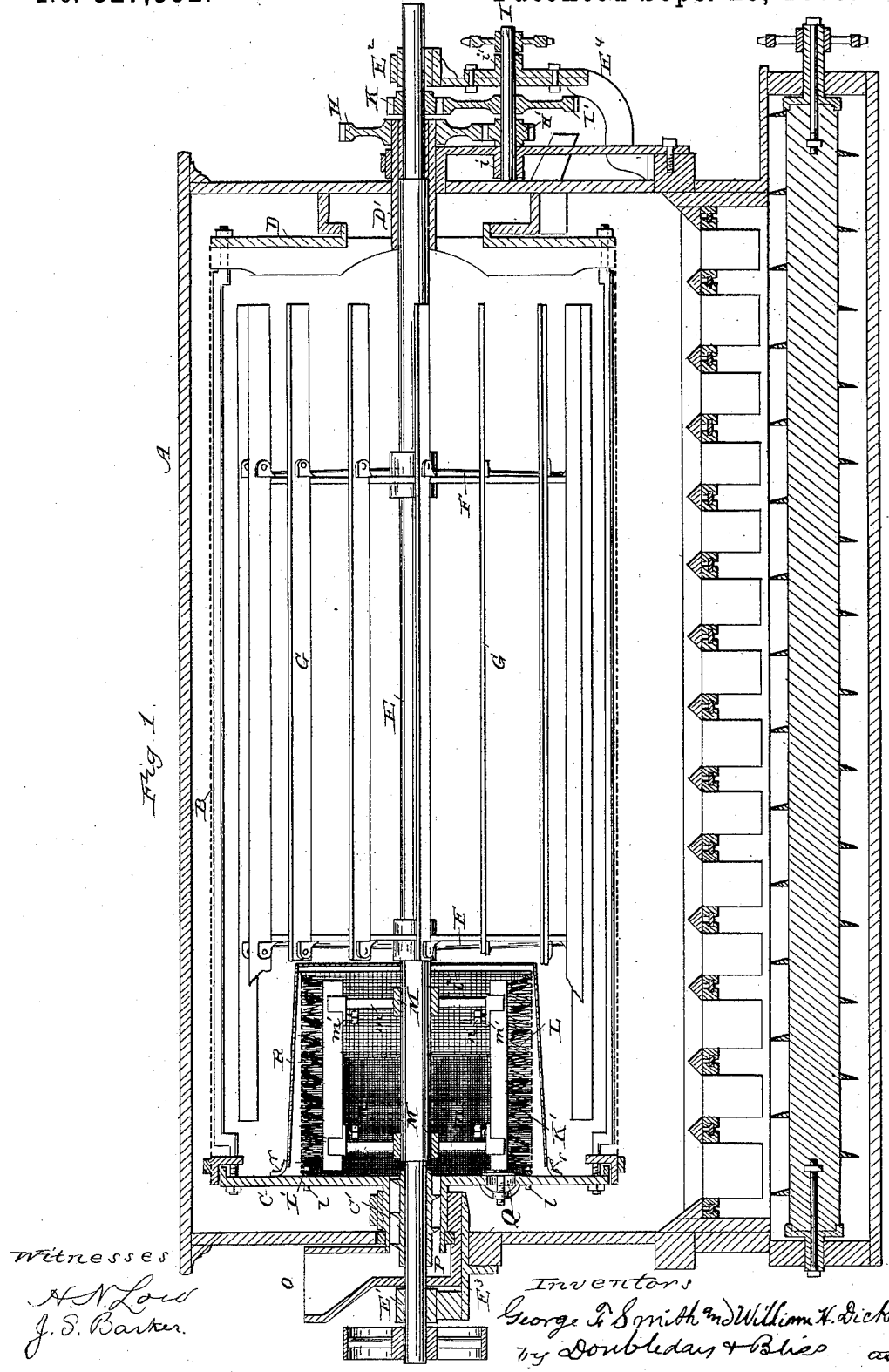

UNITED STATES PATENT OFFICE.

GEORGE T. SMITH AND WILLIAM H. DICKEY, OF JACKSON, MICHIGAN.

CENTRIFUGAL REEL.

SPECIFICATION forming part of Letters Patent No. 327,332, dated September 29, 1885.

Application filed March 17, 1883. (No model.)

*To all whom it may concern:*

Be it known that we, GEORGE T. SMITH and WILLIAM H. DICKEY, citizens of the United States, residing at Jackson, in the county of Jackson and State of Michigan, have invented certain new and useful Improvements in Centrifugal Reels, of which the following is a specification, reference being had therein to the accompanying drawings.

Figure 1 is a longitudinal section of a reel constructed with our improvements, this figure showing also a surrounding casing and conveyer mechanism below the reel. Fig. 2 is a vertical cross-section. Fig. 3 is a vertical section, enlarged, of the disintegrator.

The improvements which we have devised are applicable generally to reels of a class known as "centrifugal reels;" and we do not wish to limit ourselves to any specific form of the reel, though we have shown and will describe but one construction having our improvements embodied.

We have in another application, No. 98,703, filed June 20, 1883, shown and described a reel similar to that which we are about to explain; and as we propose to claim in said application No. 98,703 some parts of our reel, we desire to limit the invention for which protection is herein sought to the novel features which are specifically recited in and covered by the claims hereof.

In the drawings, A represents a casing or housing, which may be of the ordinary character.

B represents the silk cloth or covering of the reel. It is supported upon heads C D, these heads being cast with or provided with hollow trunnions C' D'.

E is a shaft mounted centrally within and extending longitudinally through the reel. It is mounted in bearings E' E², the bearing E' being supported by means of a bracket-plate, E³, and the bearing E² being supported by a standard or upright, E⁴.

F F are spiders having the radially-extending arms F', carrying the beaters or spreaders G, the spiders being secured upon the shaft E by means of their hubs. The beaters or spreaders G are, by means of shaft E, revolved within the reel, and independently thereof, at a speed considerably greater than that of the reel. Preferably the relative speeds are in the proportion of ten to one.

A rotary motion is transmitted from the shaft to the reel through the following devices: K represents a wheel mounted upon the shaft E, and meshing with another wheel, I', on a supplemental shaft, I, preferably below the shaft E, and mounted in bearings $i$ $i'$, supported by the casing A and upright E⁴. H' is a wheel on shaft I, meshing with a wheel, H, secured to the outer end of the hollow trunnion D' at the tail of the reel. When the shaft E is rotating, motion is transmitted therefrom, through the devices last described, to the reel, as will be readily understood, the speed being reduced in about the ratio mentioned.

Within the reel, at the head end or receiving end, we arrange the disintegrator.

Referring particularly to Figs. 1 and 3, K' L is a cylinder formed of wire-cloth of different sizes of mesh, the part L being much coarser than the part K'.

L² is the circular head arranged to close the inner end of the cylinder or cage.

$l$ $l$ are bolts, and L' is a clamp, by means of which the cage is firmly secured to the head C of the reel, so as to rotate with it.

M M are hubs secured to the main shaft E, and each provided with two or more radially-projecting arms, $m$. Each of these arms is provided at its outer end with a socket or fork, within which the backs of the brushes N N are seated.

$n'$ $n'$ are set-screws seated in lugs $m'$, attached to or cast upon the arms $m$, whereby the brushes may be properly adjusted so that their bristles shall engage with or be in close proximity to the inner surface of the wire-cloth cage. As shown in the drawings, these brushes are arranged on lines parallel with the main shaft E; but, when preferred, they may be arranged spirally, substantially as are the beaters G, in order that by their revolution they shall gradually work the material within the cage toward the disk or head-piece L².

The material is fed to the disintegrator by means of a hopper, O, and a passage-way or conduit, P, in which there is arranged a conveyer carried by the main shaft E.

In operation the material to be bolted is fed through the said hopper and conduits into the disintegrator, upon entering which it is operated upon by the radially-revolving brushes, which not only break up all cakes in lumps, but also scour the bran to some extent while the same is passing around between the brushes and the wire cylinders. Such portions of the material as are not driven through the finer cloth pass along to the coarser mesh, and escape thence into the open space within the reel, where they are acted upon by the revolving beaters G, as will be readily understood by those who are familiar with this class of bolters, except that if there be any foreign materials which it is not desirable to have pass into the reel they are caught and retained within the wire cylinder, and may be removed therefrom through a hand-hole at Q, which may be covered by a movable cap or plate.

R is a sheet-metal casing surrounding the reticulated cylinder of the disintegrator, and at such distance therefrom as to leave an annular space between the two. The casing B is slightly funnel-shaped—that is to say, its inner closed end is of less diameter than its outer end, which is adjacent to the reel-head, so that as the reel revolves material which has passed through the reticulated cylinder will slide forward to the front open edge of the shell. This casing is connected with the reel-head by means of brackets or angle-irons $r$, with its inner edge at some distance from the casing, and may, when desired, be provided with a number of perforations to permit the material to escape freely through it; but we do not wish to be limited to its use, although under ordinary circumstances it is desirable to combine it with the disintegrator, because it delivers the material close to the head of the reel, thereby insuring that the entire surface of the bolting-cloth with which the reel is covered shall be utilized.

We are aware that a disintegrator has been previously used in this class of reel—for instance, such as is shown in Patent No. 266,781, to Dell; but we believe ourselves to be the first to use in a disintegrator a casing having different sizes of mesh; and we also believe ourselves to be the first to use a brush or series of brushes in a disintegrator of a centrifugal reel. Hence we do not wish to be limited to the use of wire-cloth for the cylinder or casing of the disintegrator, as under some circumstances the same may be made of finely perforated or reticulated sheet metal, and in which latter case, as in the construction shown, the reticulations may be of different sizes.

We are also aware that both in bran-dusters and in reel-bolts stationary and rotating brushes have been arranged to revolve in contact with the inner surface of the bolting-cloth; hence we do not claim such construction; but by means of the combination of devices which we have invented we are enabled to accomplish new results and to make a much more thorough and effective separation of flour from particles of bran and other deleterious pulverulent impurities than can be accomplished by the use of any other bolting apparatus of which we have knowledge.

Thus it is well known to millers that under many conditions it is desirable to subject the material which is to be bolted to a thorough brushing action, in order to detach particles of fine and pure flour from the particles of bran, to which they still adhere when introduced into a bolt, and that the desired separation can be best effected by subjecting the material to this scouring action immediately before its delivery to the bolt-cloth. This desired end we accomplish by the use of our invention, which consists, essentially, in subjecting the mingled mass of flour, pulverulent impurities, and particles of bran to the action of a brush while traversing the inner surface of a bolt-cloth, and then passing such material as has been forced through the bolt-cloth directly to the beaters of the centrifugal reel.

By using different grades of cloth, the finest at the head or receiving end of the disintegrator, we insure that the coarser particles of bran, which have ordinarily a thicker layer of flour attached to them than is attached to the finer particles, shall be subjected to the longer brushing action, it being evident from an examination of the drawings that such coarser particles will be brushed until they have gradually made their way toward the lower end of the disintegrator.

What we claim is—

1. In a centrifugal reel, the combination of the following elements, namely: a substantially-cylindrical bolting-cloth, a series of revolving beaters within the bolting-cloth, a reticulated cylinder attached to the reel-head and concentric to the reel, brushes revolving within the reticulated cylinder, and a funnel-shaped casing having its smaller end closed and its larger end connected with the reel-head and at a short distance therefrom, substantially as set forth.

2. In a centrifugal reel, the combination of the following elements, namely: a substantially-cylindrical bolting-cloth, a series of beaters arranged to rotate within the bolting-cloth, a reticulated cylinder attached to the reel-head concentric to the bolting-cloth and constructed with meshes of different degrees of fineness, and a brush arranged to rotate within the reticulated cylinder, and in contact with its inner surface, substantially as set forth.

3. In a centrifugal reel, the combination of the following elements, namely: a substantially-cylindrical bolting-cloth, a disintegrator arranged within the reel and concentric thereto, and a casing surrounding the disintegrator and adapted to deliver material in close proximity to the reel-head, substantially as set forth.

In testimony whereof we affix our signatures in presence of two witnesses.

GEORGE T. SMITH.
WILLIAM H. DICKEY.

Witnesses:
GEO. S. BENNETT,
I. F. KNAPP.